United States Patent [19]

Benjey et al.

[11] Patent Number: 5,524,662

[45] Date of Patent: Jun. 11, 1996

[54] FUEL TANK VENT SYSTEM AND DIAPHRAGM VALVE FOR SUCH SYSTEM

[75] Inventors: Robert P. Benjey, Dexter; Bryce Schwager, Ypsilanti Township; Matthew Villemure, Chelsea, all of Mich.

[73] Assignee: G.T. Products, Inc., Ann Arbor, Mich.

[21] Appl. No.: 284,264

[22] Filed: Aug. 2, 1994

Related U.S. Application Data

[63] Continuation of Ser. No. 15,124, Feb. 8, 1993, abandoned, which is a continuation-in-part of Ser. No. 772,728, Oct. 7, 1991, Pat. No. 5,215,110, which is a continuation-in-part of Ser. No. 607,744, Oct. 29, 1990, Pat. No. 5,054,508, which is a continuation of Ser. No. 470,318, Jan. 25, 1990, abandoned.

[51] Int. Cl.⁶ .................................. F16K 24/04
[52] U.S. Cl. ............................... 137/43; 137/587
[58] Field of Search ................. 137/43, 202, 587; 220/86.2, 746

[56] References Cited

U.S. PATENT DOCUMENTS

| | | | |
|---|---|---|---|
| 3,616,783 | 3/1970 | La Masters | 123/136 |
| 4,153,025 | 5/1979 | Thornburgh | 123/136 |
| 4,699,638 | 10/1987 | Harris | 55/168 |
| 4,714,172 | 12/1987 | Morris | 220/746 X |
| 4,770,677 | 9/1988 | Harris | 55/168 |
| 4,790,349 | 12/1988 | Harris | 137/587 |
| 4,816,045 | 3/1989 | Szlaga et al. | 55/168 |
| 4,826,511 | 5/1989 | Harris | 55/168 |
| 4,836,835 | 6/1989 | Harris et al. | 55/168 |
| 4,869,283 | 9/1989 | Deffling et al. | 137/43 |
| 4,887,578 | 12/1989 | Woodcock et al. | 123/519 |
| 4,944,779 | 7/1990 | Szlaga et al. | 55/168 |
| 4,953,583 | 9/1990 | Szlaga | 137/587 X |
| 5,054,520 | 10/1991 | Sherwood et al. | 137/587 |
| 5,065,782 | 11/1991 | Szlaga | 137/202 X |
| 5,099,880 | 3/1992 | Szlaga et al. | 137/587 |
| 5,111,795 | 5/1992 | Thompson | 123/519 |
| 5,116,257 | 5/1992 | Szlaga | 137/43 |
| 5,165,379 | 11/1992 | Thompson | 123/520 |
| 5,234,013 | 8/1993 | Roetker et al. | 137/43 |
| 5,234,022 | 8/1993 | Harris | 137/498 |
| 5,318,069 | 6/1994 | Harris | 137/588 |
| 5,327,934 | 6/1994 | Thompson | 137/588 |

*Primary Examiner*—Gerald A. Michalsky
*Attorney, Agent, or Firm*—Young, MacFarlane & Wood

[57] ABSTRACT

A diaphragm-activated control valve and system for both refuel and running loss venting of a fuel tank to a vapor trap. The control valve is connected to fill control and rollover valves in the fuel tank, and defines a separate venting flow path for each valve to the vapor trap. The control valve is responsive to pressure conditions at the filler pipe inlet to alternately open and close the flow paths. During refueling the control valve vents the tank through the fuel-level responsive fill control valve. When the filler pipe inlet is closed, the control valve switches to vent the tank through the rollover valve. In a preferred form, the control valve includes a liquid fuel drain to prevent its being disabled by fuel entering from the filler pipe inlet via the signal pressure line during refueling. The drain includes a reverse flow check valve to prevent vapor venting out the drain path to the atmosphere during refueling.

22 Claims, 8 Drawing Sheets

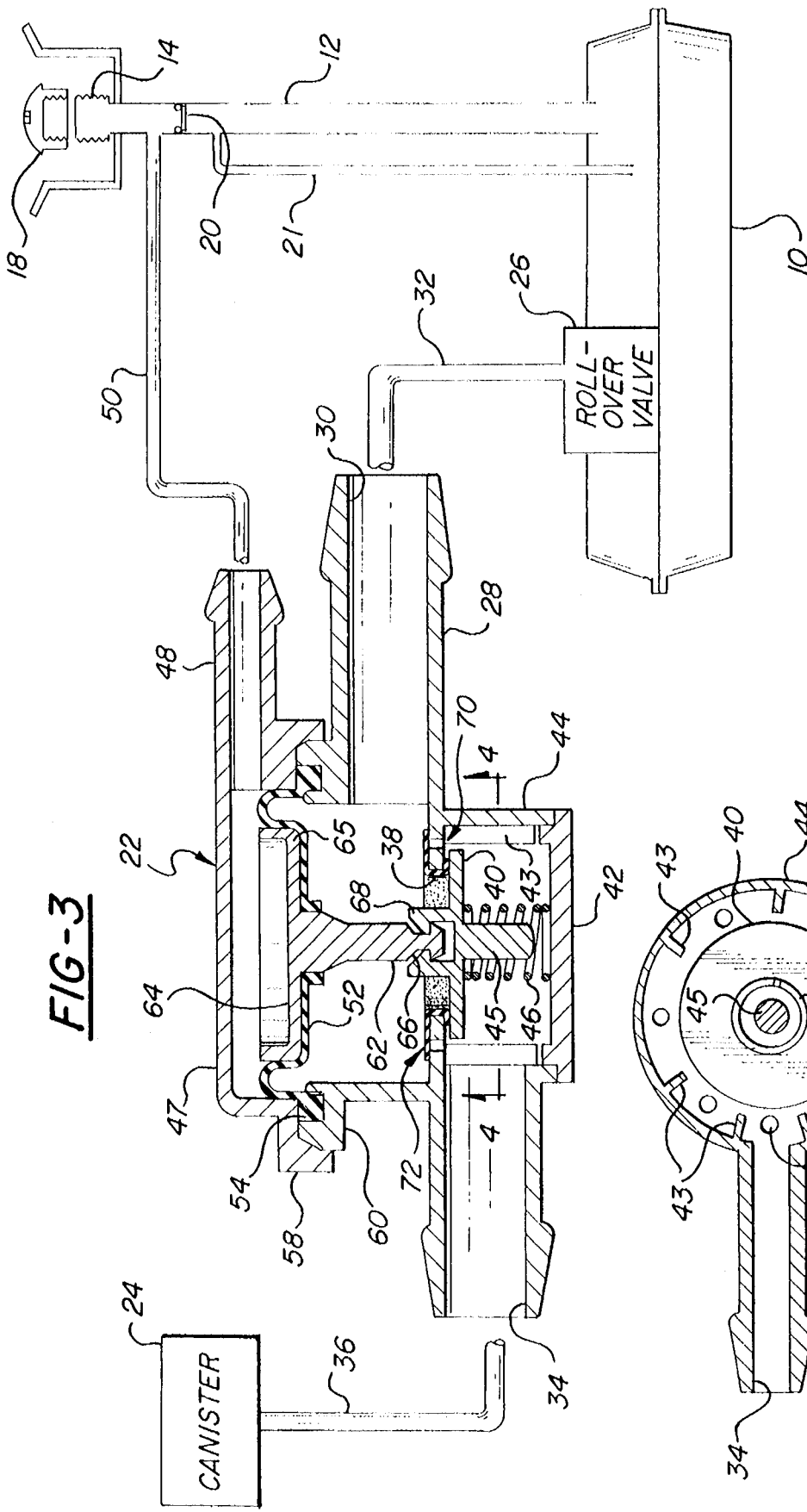

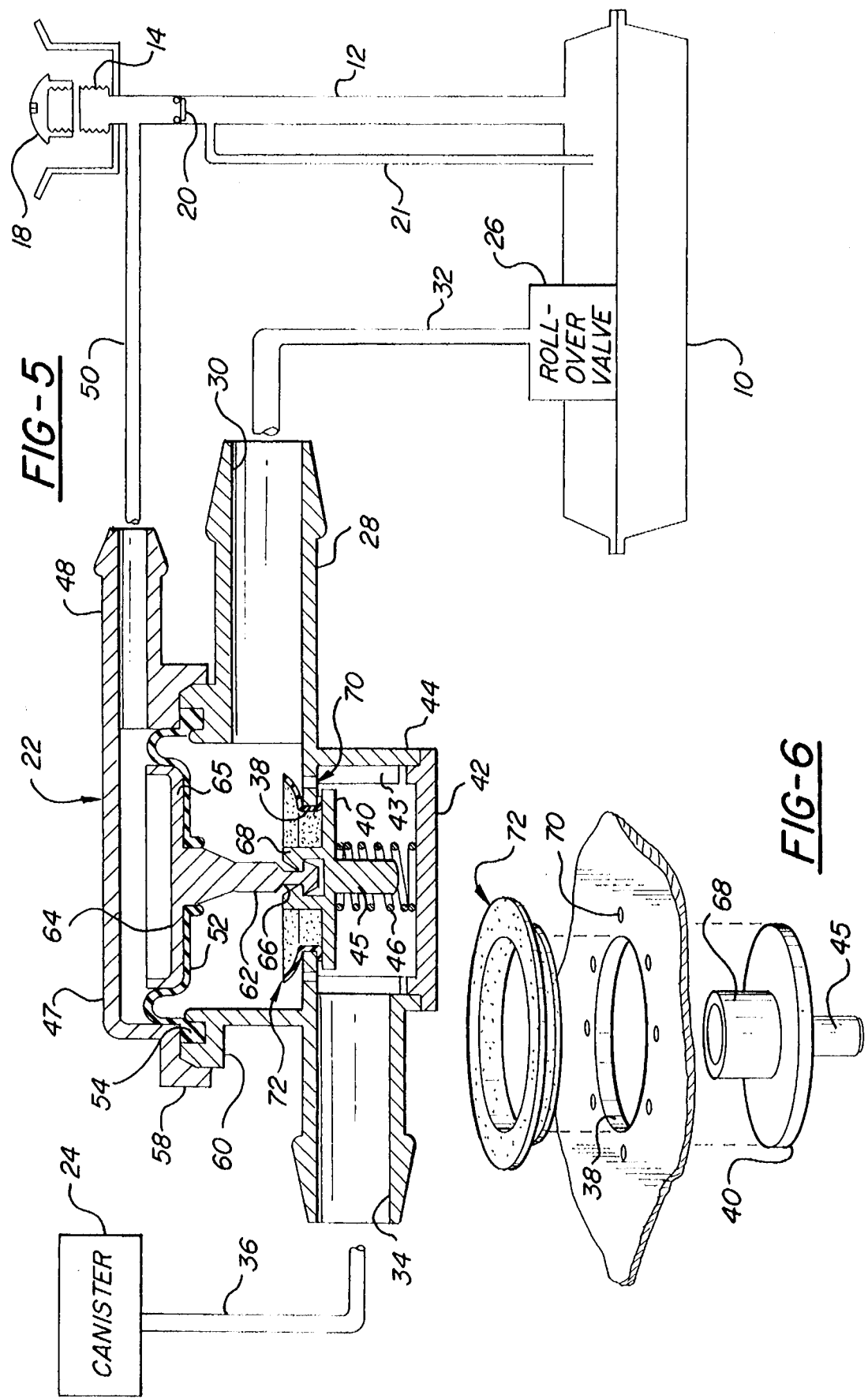

FUEL TANK VENT SYSTEM AND DIAPHRAGM VALVE FOR SUCH SYSTEM

PRIOR APPLICATIONS

This is a continuation of Ser. No. 08/015,124, filed Feb. 8, 1993, now abandoned, which is a continuation-in-part of U.S. Ser. No. 772,728 filed Oct. 7, 1991, now U.S. Pat. No. 5,215,110, which is a continuation-in-part of U.S. Ser. No. 607,744 filed Oct. 29, 1990, now U.S. Pat. No. 5,054,508 issued Oct. 8, 1991, which is a continuation of U.S. Ser. No. 470,318 filed Jan. 25, 1990, now abandoned.

INTRODUCTION

This patent discloses a vehicular fuel tank vent system which vents fuel vapors from the tank to a vapor trap under normal operating conditions, and which assumes a non-venting condition when the fuel tank filler cap is removed. In addition, a diaphragm valve suitable for use in such a system is disclosed.

BACKGROUND OF THE INVENTION

It is well understood in the vehicle fuel storage and delivery art that it is necessary to vent a vehicle fuel tank to relieve vapor pressure build-up which may occur when the filler pipe cap is in place and to permit the escape of air during normal filling operations when the filler cap is removed. Environmental control laws and regulations require that vehicle fuel tank systems include safeguards to prevent the excessive escape of fuel vapors under normal operating conditions and to prevent the escape of raw fuel from the tank in the event of a roll-over accident or the assumption of an abnormal vehicle attitude.

In this connection it is well known to vent the fuel system to a vapor trap such as a carbon canister. It is important to ensure that fuel vapor and/or raw fuel from the tank does not flood the canister during normal vehicle operation or during filling. This can be achieved with a device known as a "vent valve", such as that disclosed in U.S. Pat. No. 4,753,262 issued Jun. 28, 1988 and assigned to the assignee of this patent. Another rollover valve is shown in Pat. No. 4,095,609 issued Jun. 20, 1978 and assigned to Chrysler Corporation.

While excessive pressure in the tank is the more commonly recognized problem, it is also true that a vacuum or negative pressure can be created in the interior of a fuel tank upon rapid cooling of the heated vapor volume contained herein. If this negative pressure condition is not relieved, even a slight pressure drop acting over the interior surface of the fuel tank can cause it to buckle or collapse. This can change fuel capacity, decalibrate the fuel gage and create a fuel spill hazard.

SUMMARY OF THE INVENTION

In combination with a fuel tank for a vehicle having a fuel vapor trap such as a carbon canister, the invention generally comprises a system including a rollover valve connected to the fuel tank; a fuel-level responsive valve, e.g. a fill control valve, connected to the fuel tank; and a control valve connected to the rollover valve, the fuel level responsive valve and the vapor trap. The control valve defines a first vapor flow path between the rollover valve and the vapor trap, and a second vapor flow path between the fuel level responsive valve and the vapor trap, and includes condition-responsive means for operating the control valve to alternately open and close the first and second flow paths, such that the vent valve effectively connects the rollover valve and the fill control valve in parallel. The condition-responsive means includes independent first and second valve elements, in a further and preferred embodiment comprising diaphragm-type valve elements responsive to changing pressure conditions at the filler pipe inlet.

In a further form the invention comprises a vent valve having a valve body, a vapor outlet to the vapor trap, and a vapor inlet from the rollover valve. A valve seat is defined between the vapor inlet and the vapor outlet, a valve element is matable with the valve seat, and a control element connected to the valve element maintains the valve element on the valve seat when the filler pipe is at atmospheric pressure, and displaces the valve element from the valve seat when the filler pipe is at tank pressure. Additionally, a fill control valve is disposed between the fuel tank and the vapor trap, and the vent valve includes a second vapor inlet from the fill control valve and a second valve seat between the second vapor inlet and the vapor outlet. A second valve element is matable with the second valve seat, and the second control element connected to the second valve element displaces the second valve element from the second valve seat when the filler pipe is at atmospheric pressure, and maintains the second valve element on the second valve seat when the filler pipe is at tank pressure. The first and second valve elements operate independently.

In yet a further embodiment, the first and second valve elements are diaphragm-operated valve elements which define between them a pressure chamber in the valve body, the pressure chamber being connected to a vapor inlet from the filler pipe. The first and second valve elements are pressure balanced such that higher vapor pressure in the pressure chamber forces the valve elements in opposite directions to open a rollover venting path associated with the first valve element and to simultaneously close a fill control venting path associated with the second valve element. Lower pressure in the pressure chamber, for example when the filler pipe cap is removed, forces the first and second valve elements toward one another to close the rollover venting path and open the fill control venting path.

In another embodiment of the invention, a drainage throughbore with an internal check valve is formed in one of the diaphragm valve elements.

These and other features of the present invention will become apparent upon further reading of the specification.

BRIEF DESCRIPTION OF THE DRAWINGS

FIG. 3 shows the system of FIG. 1 incorporating a reverse flow vent according to an alternate embodiment of the invention;

FIG. 4 is a sectional view through a portion of the valve body of FIG. 3;

FIG. 5 is a view of the embodiment of FIG. 3 showing the reverse flow vent in an open position;

FIG. 6 is an exploded perspective view of a portion of the diaphragm valve and the reverse flow vent of the embodiment of FIGS. 3 to 5;

DETAILED DESCRIPTION OF THE ILLUSTRATIVE EMBODIMENT

Figures 1, 2:
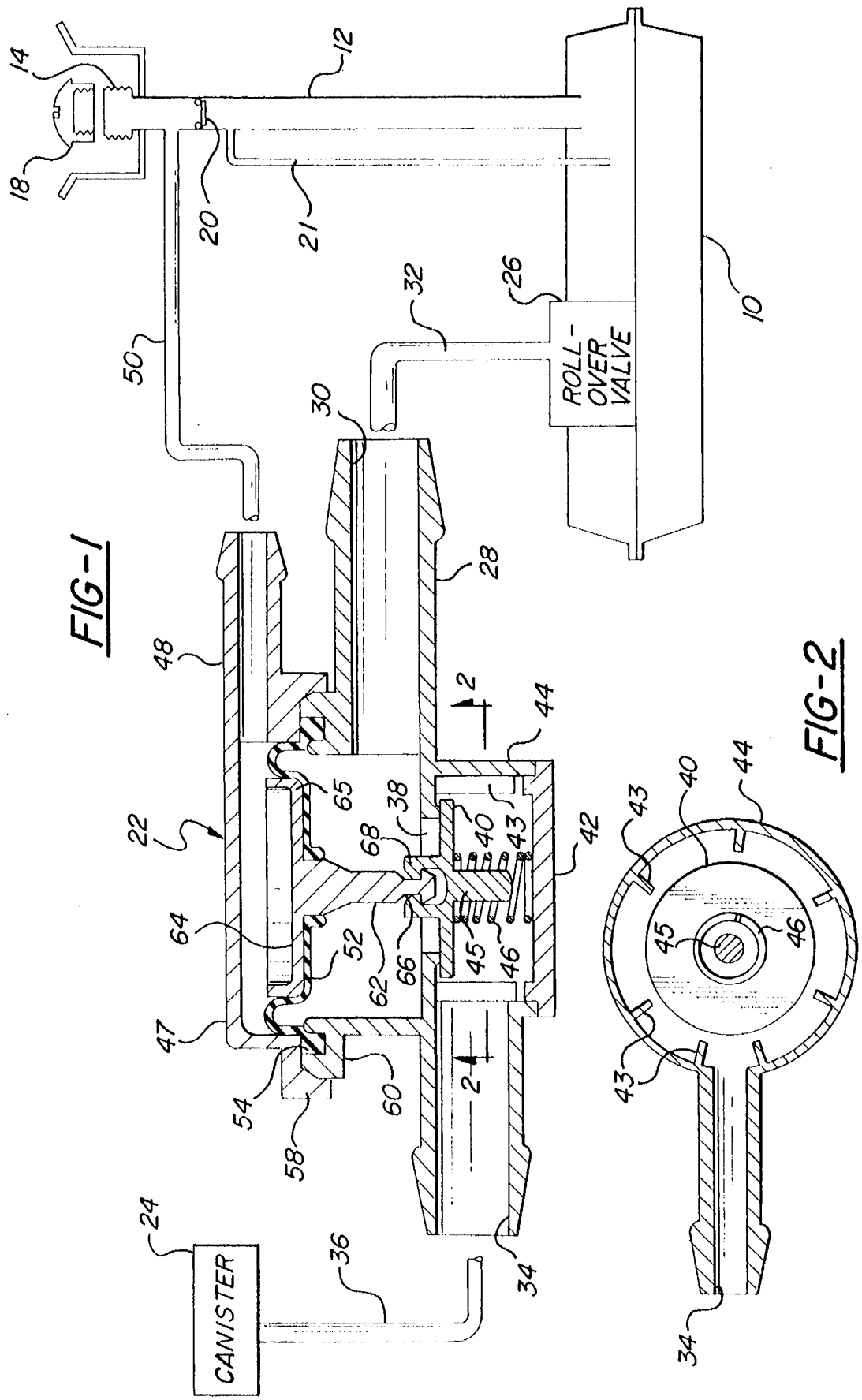
FIG. 1 is an overall schematic view of a fuel vent system embodying the invention and a sectional view of the details of the diaphragm valve showing its location and operative connections in the system.
FIG. 2 is a sectional view through a portion of the valve body as indicated.

Referring to the figures, a fuel storage tank 10 is mounted in a vehicle (not shown) and is equipped with a filler pipe 12 which extends to a conventionally threaded inlet opening 14 proximate the exterior body portions 16 of the vehicle. The threaded inlet opening 14 is adapted to receive a cap 18 which, when in place, effectively seals the filler pipe 12.

Filler pipe 12 is additionally provided with a spring biased door 20 which is sufficiently proximate the inlet opening 14 to be displaced open by the introduction of a conventional fuel dispenser valve nozzle (not shown). The door 20 closes when the filler nozzle is removed; i.e., typically after a filling operation has been completed. Door 20, therefore, prevents the excessive escape of fuel vapor from the freshly filled tank 10 during the typically short time period between the termination of the filling operation and the replacement of the cap 18. Door 20 is currently a relatively unsophisticated metal structure; however, the invention disclosed herein contemplates use with doors having significantly more effective seals as well. Such seals may require a designed bleed or a small-volume bypass as hereinafter explained. A conventional vent line 21 runs from the tank to a point in the filler pipe 12 below door 20 to vent displaced air during filling.

The drawing further discloses in detail a vent valve 22 which is connected between the tank 10 and a carbon canister 24 which acts as a fuel vapor trap. The vehicle system may further be provided with a roll-over valve 26 to prevent the escape of raw fuel from the tank 10 through the vent valve 26 in the event of a roll-over accident or an unusual vehicle attitude. Valve 26 may be essentially of known construction.

Vent valve 22 comprises a multi-part body including a first molded plastic body portion 28 having an essentially tubular inlet 30 adapted for connection to a fuel vapor vent line 32 which is connected to the interior of the tank 10 through the roll-over valve 26. Valve body portion 28 further comprises an essentially tubular outlet portion which is adapted for connection to a vent line 36 which is connected to the carbon canister 24. Between the inlet 30 and the outlet 34 the central cylindrical portion of the valve body is provided with an annular valve seat 38 adapted to receive and mate with a disk-like valve element 40 which may also be constructed of molded plastic. Valve element 40 is adapted for longitudinal motion along the illustrated center line and is maintained in its central position by a plurality of ribs 43 which are molded into the cylindrical wall 44 of the central cylindrical portion of the valve body portion 28. An axially projecting finger 45 of the valve element 40 projects into the interior of a light stainless steel bias spring 46 which urges the valve plate 40 against the seat 38. If diaphragm 52 has some spring-like compliance, spring 46 may be omitted.

The vent valve 22 further comprises a second molded plastic body portion 47 forming a tubular inlet 48 which is adapted for connection to a filler pipe pressure line 50 which is connected into the filler pipe 12 above the door 20 and in the vicinity of the fuel inlet 14 for purposes to be described.

A disk-like diaphragm 52 of suitable flexible material such as fluorosilicone rubber is mounted in the valve 22 by way of an annular, peripheral welt 54 which is received in and trapped between the mating flanges 58 and 60 of the valve body portions 48 and 28 respectively. Diaphragm 52 is press fit onto the center pin 62 of a cup-shaped carrier 64 having an annular exterior shoulder 65 to control the shape of the diaphragm 52. Center pin 62 terminates at the lower end in a necked-down portion 66 which receives inwardly projecting spring tangs 68 formed integrally with the valve plate 40 to mechanically interconnect the valve plate 40 with the carrier 64. Assembly of the valve 22 is facilitated by this mechanical interconnection but it will be apparent to those skilled in the art that various alternative constructions are possible in which the elements are either integrally formed, otherwise unified or separated by boundaries at locations other than those shown. The valve body elements 28, 42, and 47 of the illustrated device are adhesively bonded and/or welded by ultrasonic techniques or the like.

OPERATION

In normal vehicle operation the tank 10 is at least partially filled and the cap 18 is in place on the filler neck 14 to seal the fuel tank. Door 20 is closed but, either because it is a relatively crude seal or includes a designed bleed as previously described, pressures on opposite sides of seal 20 eventually equalize. If the vehicle is in a normal attitude, rollover valve 26 is open. Therefore, vapor pressure in tank 20 is applied to the under side of the diaphragm 52 by way of line 32 and inlet 30. Similarly, tank vapor pressure is applied to the upper side of the diaphragm and to the cup-shaped member 64 by way of line 50 and inlet 48. The effective areas on opposite sides of the diaphragm 52 and carrier 64 are selected to respond to this equalized pressure condition to apply effectively no force to the valve element 40. Vapor pressure in tank 10, therefore, operates on the top surface of valve plate 40 to displace it against the light action of the spring 46 (canister 24 operates at essentially atmospheric pressure). The vapor pressure in tank 10 is thus communicated through inlet 30 around valve plate 40, clearance for high volume transfer being provided by the ribs 43, through outlet 34 and through line 36 to the canister 24. This is a high volume, low restriction venting condition.

When the cap 18 is removed, atmospheric pressure exists in the area of the filler inlet 14 and is communicated via line 50 to the cup-shaped carrier 64 and, therefore, effectively to the top of the diaphragm 52. Due to the door 20, relatively higher tank pressure is communicated to the bottom of the diaphragm 54 and the net force drives the carrier 64 upwardly within the valve body 22 pulling the valve plate 40 against the seat 38. This closes the vent between the tank 10 and the canister 24 to effectively prevent transmitting any vapor or liquid to the canister during a filling operation.

The system described above is operable with simple metal doors 20 as well as with the more effective seals which are proposed for future automobiles. Moreover, the system is compatible with filler nozzle designs which include provision for vapor extraction during filling.

THE EMBODIMENT OF FIGS 3 TO 6

Valve seat 38 has formed therein a plurality of vents 70 radially outward of the position of valve plate 40 when held against seat 38, effectively bypassing the opening defined by seat 38 to provide communication between inlet 30 connected to the tank 10, and outlet 34 connected to the carbon canister 24. Vents 70 are unobstructed by valve plate 40 even when the plate is seated firmly against seat 38.

A flexible annular flap valve 72, premolded with a J-shaped cross-section comprising a large diameter upper flange 73 and a smaller diameter lower flange 74 joined by bight portion 75, is press-fit onto valve seat 38 with upper flange 73 overlying vents 70 on the upper surface of the valve seat mediate the valve seat and inlet 30. Lower flange 74 engages the lower surface of valve seat 38 radially inward of vents 70. Flap valve 72 is preferably made of a thin-walled, pliable material such as fluorosilicone rubber and is molded such that it engages valve seat 38 in a secure friction fit when installed as shown in the drawings, particularly adjacent bight portion 75. The end of upper flange 73 radially outward and above vents 70, due to its distance from bight portion 75 and the pliable nature of the material used, will tend to engage the surface of the valve seat 38 with less force than either its inboard end or shorter lower flange 74.

Although flap valve 72 is shown in the illustrated embodiment as a pliable, pre-molded, J-shaped cross-section valve, other forms will be apparent to those skilled in the art. For example, flap valve 72 could be a flat annular ring with an inner diameter folded around valve seat 38 and fastened to the lower surface thereof adhesively or mechanically upon assembly of the valve. Alternatively, a flat annular ring having an inner diameter radially inward of vents 70 and an outer diameter radially outward of vents 70 could be fastened at its inner diameter to the upper surface of valve seat 38. Yet another embodiment envisions a plurality of individual flap valves 72 corresponding to vents 70, for example a plurality of one-way axial poppets mounted in vents 70. However, a one piece, flexible, pre-molded valve such as that shown in the drawings is preferred for its economical manufacture, ease of assembly with the valve seat and sensitivity to pressure changes in the fuel tank. Also, although flap valve 72 is shown frictionally secured to valve seat 38 in a press-fit, it could be additionally fastened at lower flange 74 to the lower surface of seat 38 mediate the seat and valve plate 40, for example adhesively or mechanically.

In the illustrated embodiment in which lower flange 74 of flap valve 72 engages the lower surface of valve seat 38, the resilient nature of the flap valve material improves the seal between plate 40 and seat 38.

Vapor pressure in tank 10 is also applied to the upper surface of upper flange 73 of flap valve 72, pressing firmly against vents 70 to form a tight seal.

With valve plate 40 pulled close against valve seat 38 by diaphragm 54, the relatively higher tank pressure communicated to the underside of diaphragm 54 will maintain upper flange 73 of flap valve 72 against vents 70 to prevent fuel vapor from flowing from tank 10 to carbon canister 24.

As previously described, with cap 18 closing filler inlet 14, and normal above-atmospheric vapor pressure in tank 10, valve plate 40 is displaced from valve seat 38 to permit vapor flow from tank 10 to carbon canister 24. If the heated vapor volume in tank 10 is suddenly cooled, for example by tank contact with cold water or snow, the vapor can contract in a known manner to create a sub-atmospheric or negative pressure in tank 10. If this negative pressure is not relieved, the vacuum forces exerted on the surface of tank 10 can cause it to buckle or even collapse, creating a serious fuel spill hazard. Referring to FIG. 2, filler inlet 14 is closed by cap 18 and a negative pressure differential exists between tank 10 and carbon canister 24 (which is typically at atmospheric pressure), causing reverse flow of fuel vapor and air from the canister through valve 22 to the tank. This reverse flow acts on both the valve plate 40 and diaphragm 52 to pull valve plate 40 closed against seat 38.

When valve plate 40 closes, the negative pressure differential operates through vents 70 to raise the outboard end of upper flange 73 of flap valve 72, permitting reverse flow from canister 24 to tank 10 to continue through vents 70 and relieve the negative pressure in the tank. In this manner, tank 10 is protected against possible damage or collapse. When pressure between canister 24 and tank 10 equalizes, upper flange 73 will again drop down onto vents 70.

THE EMBODIMENTS OF FIGS 7 TO 9

Figure 7:
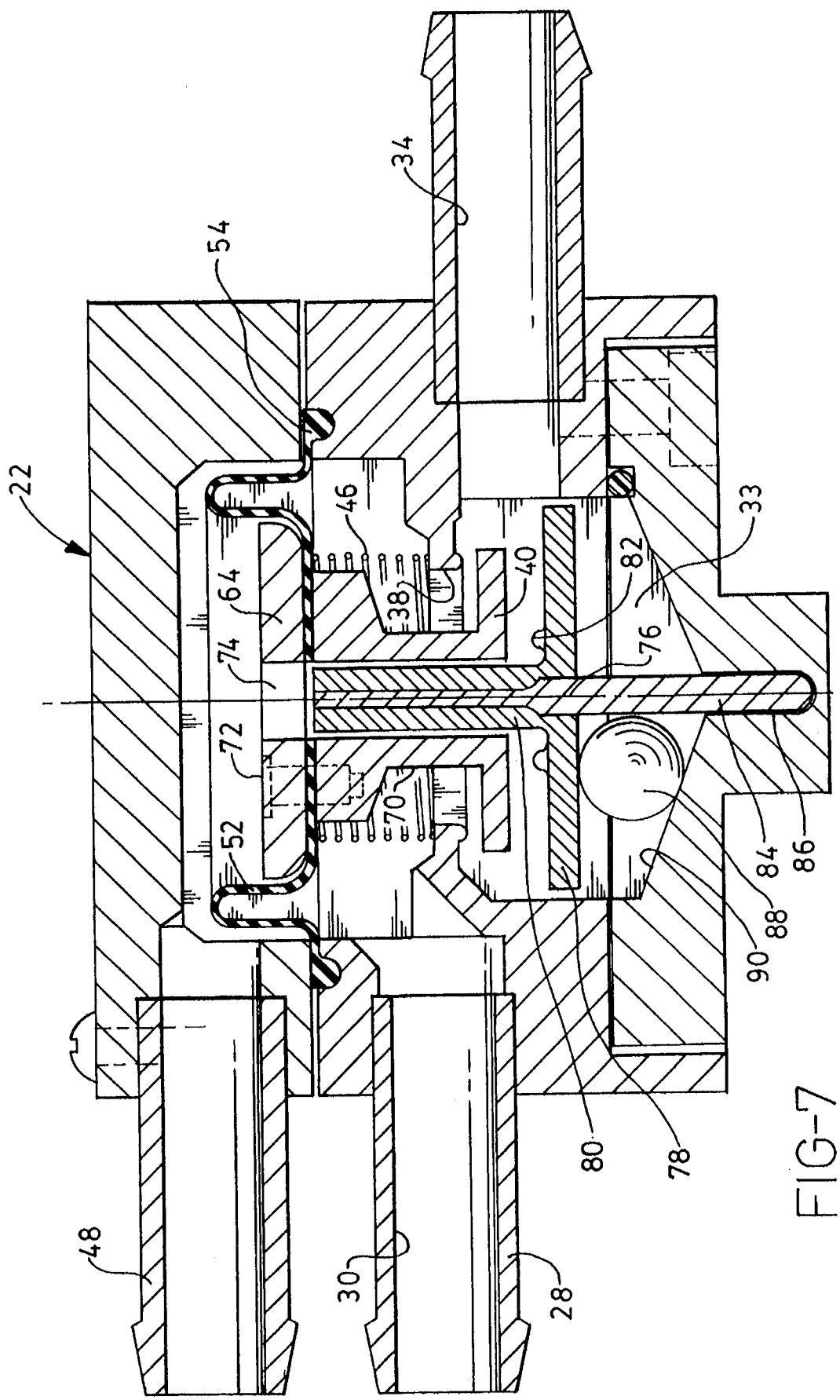
FIGS. 7 to 9 are sectional views of a third embodiment of the diaphragm valve in two operational modes.
Figure 8:
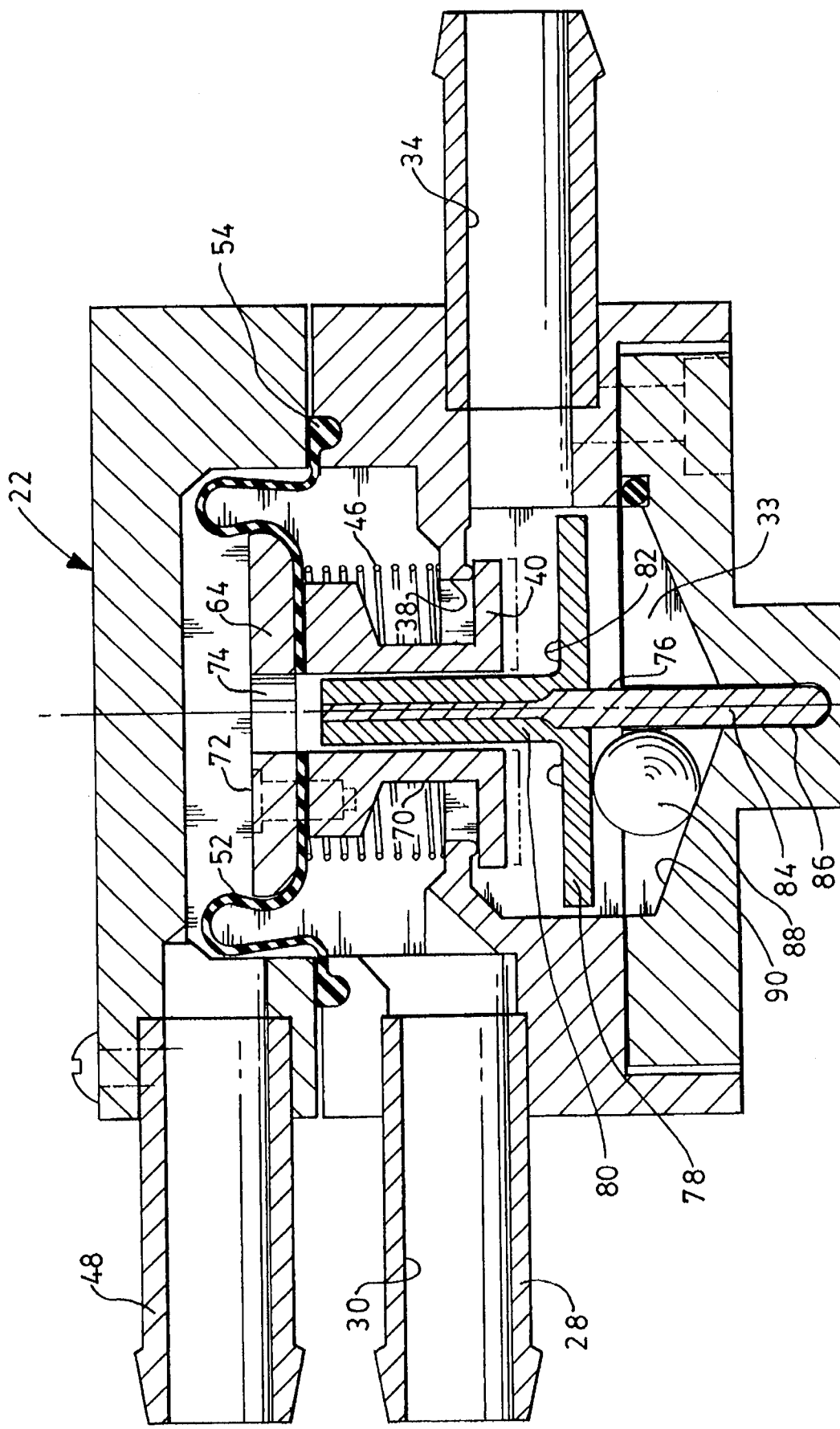
Figure 9:
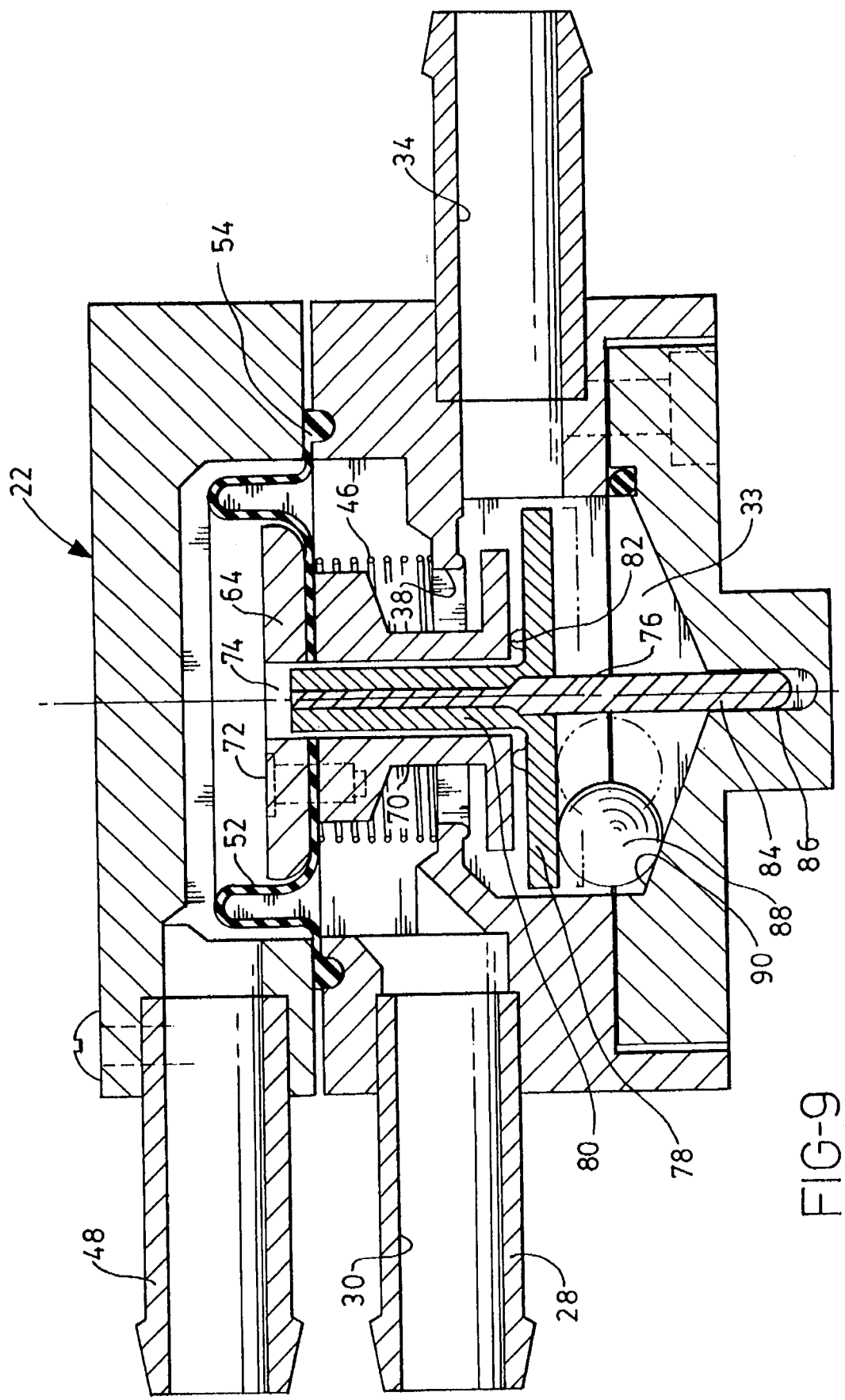

An alternate embodiment of the invention having improved operational characteristics is shown in FIGS. 7 through 9. The structure of the valve body and the various outlets and inlets to and from the filler neck, the fuel tank and the vapor canister are essentially the same. Where the structure of the valve is similar to that shown in the embodiment of FIGS. 1 and 2, the same reference numerals are employed.

Referring now to FIGS. 7 through 9, valve element 40, cup-shaped carrier 64 and connecting structure 62,66,68 have been essentially integrated as a unitary assembly 70. Valve element assembly 70 is connected to diaphragm 52 and carrier element 64 by way of a threaded bolt 72, although it will be apparent to those skilled in the art that valve element assembly 70 and carrier 64 could be connected to the diaphragm by another method, for example adhesively or by ultrasonic welding or the like. As in the embodiment of FIGS. 1 and 2, valve element assembly 70 and diaphragm 52 move as a unit.

Spring 46 has been repositioned within the valve body to act directly on carrier 64 and diaphragm 52, rather than on valve plate 40 as in the embodiment of FIGS. 1 and 2. The same bias result is achieved; i.e., valve assembly 70, diaphragm 52 and carrier 64 are biased upwardly.

A drainage throughbore 74 is formed in carrier 64, diaphragm 52 and valve element assembly 70 to provide a drain path from the upper surface of diaphragm 52 to the lower interior chamber 33 of the valve body adjacent vapor canister outlet 34. Throughbore 74 provides constant low-volume communication between the upper surface of diaphragm 52 and the vapor canister outlet 34.

A rollover valve element 76 is incorporated into the interior of vent valve 22 in chamber 33, comprising a valve plate 78, an upper guide stem 80 having an diaphragm-shaped cross-section extending upwardly into throughbore 74 for axial sliding travel therein, an annular bead or seal 82 formed on the upper surface of roll-over plate 76 with a diameter slightly larger than that of throughbore 74, and a lower axial guide stem 84 extending downwardly into a guide passage 86 formed in the lower portion of the valve body. Rollover element 76 is operated by rollover ball-and-ramp structure 88,90. Rollover element 76 is freely movable up and down along the axis of throughbore 74 independently of valve element assembly 70. Rollover element 76 is preferably made of a lightweight plastic, although other materials can be used.

The venting operation of the valve embodiment shown in FIGS. 7 through 9 is essentially the same as that of FIGS. 1 and 2. When the vehicle is in a normal attitude, rollover ball 88 is in its lowermost position as shown in FIG. 7 under the force of gravity, such that rollover element 76 is in its lowermost, open position. With cap 18 in place on the filler neck 14, fuel tank pressure is transmitted to both sides of diaphragm 52 via fuel tank inlet 30 and filler neck inlet 48. As in the embodiment of FIGS. 1 and 2, the effective areas on opposite sides of diaphragm 52 and carrier 64 are selected to respond to this equalized pressure condition to apply effectively no force to valve element assembly 70. Vapor pressure in the fuel tank 10, therefore, operates on the top surface of valve plate 40 against the light action of spring 46 to overcome the essentially atmospheric pressure acting on the lower surface of valve plate 40 from the canister 24. Vapor pressure in tank 10 is thus communicated through inlet 30 around valve plate 40 and through outlet 34 and line 36 to the vapor canister 24. Vapor flow also occurs from the filler neck to the canister via lines 50, 48 and throughbore 74. This is a high volume, low restriction venting condition.

When the cap 18 is removed, atmospheric pressure in the area of the filler neck inlet 14 is communicated via line 50 to the upper surface of diaphragm 52. The relatively higher fuel tank pressure communicated to the bottom of diaphragm 52 via fuel tank inlet 30 drives the diaphragm and valve element assembly 70 upwardly to pull the valve plate 40 closed against seat 38 as shown in FIG. 8. This closes the vent path between fuel tank 10 and the canister 24 to effectively prevent transmitting any vapor or liquid to the canister.

Should liquid fuel be transmitted via line 50 to the upper surface of diaphragm 52 and carrier 64, for example due to failure of the automatic shut-off apparatus in the filler nozzle, throughbore 74 drains the fuel from the upper surface of diaphragm 52. This prevents liquid from accumulating on the upper surface of diaphragm 52 so as to overcome the force of spring 46 and bias valve element assembly 70 to the open position regardless of the position of the cap 18 on the filler neck. The fuel drained off the upper surface of diaphragm 52 and carrier 64 in this manner enters the lower interior chamber 33 of the valve body adjacent canister outlet 34, where it either evaporates or is transmitted in liquid form to the canister. The amount of drained fuel in this situation is small enough that it has no harmful effect on the operation of the canister; i.e., it is not enough to flood or saturate canister 24.

Should the vehicle be tilted or rolled over, the force of gravity on rollover ball 88 will cause it to travel upwardly along inclined rollover ramp 90, forcing rollover element 76 upwardly to a closed position as shown in FIG. 9 in which annular bead or seal 82 abuts the lower surface of valve element plate 40 to seal off throughbore 74. Liquid fuel is thus prevented from flowing from the fuel tank through line 50, inlet 48 and through the valve to the vapor canister, where it could leak to the surroundings.

Lower axial guide stem 84 riding in stem guide aperture 86 limits the movement of rollover element 76 to movement in an axial direction. Because rollover ball 88 acts on one side of rollover valve plate 76, a moment force is generated tending to pivot valve plate 76 about the adjacent portion of annular seal 82. This lever action on the valve element, if unchecked, would break the liquid-tight seal formed between annular seal 82 and the lower surface of valve element plate 40. The close sliding fit between lower axial guide stem 84 and stem guide aperture 86 counteracts this opening moment to maintain the effectiveness of the seal between the rollover element 76 and valve element assembly 70.

Additionally, the light weight and high surface area of rollover element 76 allows it to function as an anti-"puff loss" valve. A pressure gradient typically exists in vent line 36 between valve 22 and canister 24, which pressure gradient can create a "puff loss" of expelled fuel vapor when the filler pipe cap is removed. The lightweight nature of the present rollover element 76 allows it to respond to the pressure gradient in canister vent line 36 as a pressure-responsive check valve, moving upwardly to the closed position when the filler cap is removed independent of rollover ball 88. This briefly closes off throughbore 74 until the pressure gradient is dissipated. Otherwise, pressure in canister vent line 36 might back up through throughbore 74 and out filler neck Line 50 to filler neck inlet 14 and the atmosphere.

FIGURE 10 EMBODIMENT

Figure 10:
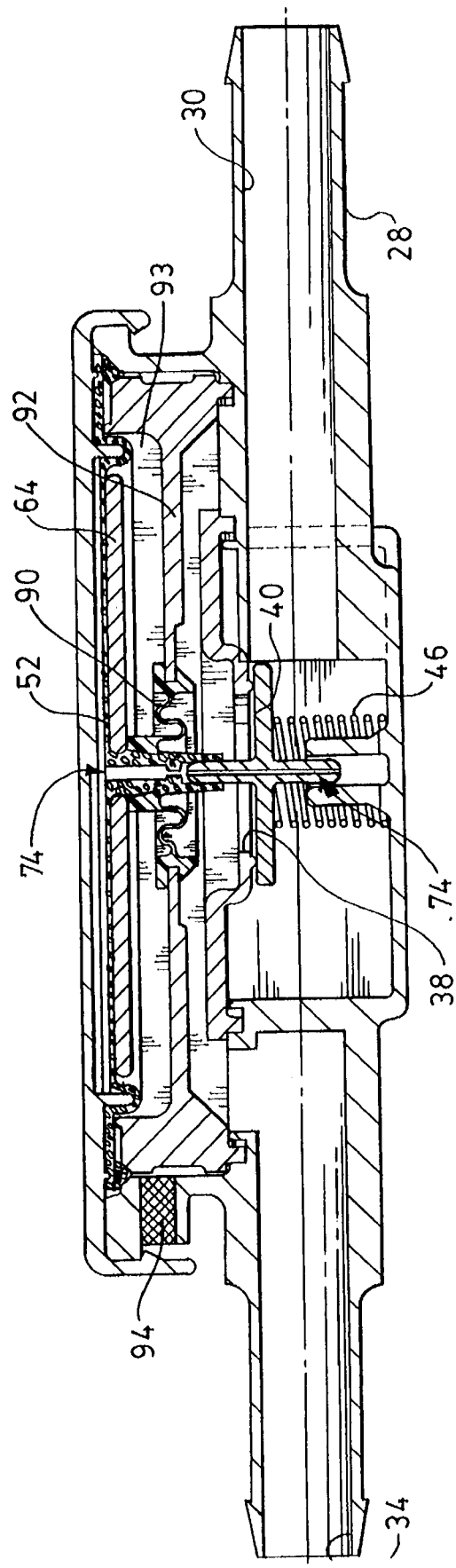
FIG. 10 is a sectional view of a fourth embodiment of the inventive diaphragm valve.

Still another embodiment of the present invention is shown in FIG. 10. The venting operation of the valve embodiment in FIG. 10 is essentially the same as that disclosed in the previous embodiments, and reference numerals are the same where the structure is similar.

Referring now to FIG. 10, carrier 64 and its connecting structure 62, 66, 68, are connected to valve element 40 and a rolling seal 90. Rolling seal 90 is a flexible diaphragm similar to diaphragm 52, and moves with diaphragm 52 and carrier 64 while maintaining an airtight seal with interior valve body partition 92. An intermediate chamber 93 is thus defined between the lower surface of diaphragm 52 and interior partition 92 above valve element 40 and valve seat 38. Intermediate chamber 93 is maintained at atmospheric pressure by way of a breather element 94 communicating with the atmosphere.

As in the embodiment shown in FIGS. 7 through 9, a throughbore 74 is formed in carrier 64, connecting structure 62, 66, 68 and valve element 40 such that liquid fuel accumulating on the upper surface of diaphragm 52 drains down into the lower chamber of the valve body adjacent the fuel tank inlet 30.

As in the previous embodiments of the invention, valve element 40 is normally biased to an open position off valve seat 38 when cap 18 is closed on the filler neck inlet 14. Fuel tank pressure is thus transmitted via signal line 50 (not shown) and inlet 48 (not shown) to the upper surface of diaphragm 52 and carrier 64, overcoming the atmospheric pressure in chamber 92 to force the diaphragm and carrier downwardly against valve element 40 and the light bias of spring 46. The valve is then open to vent fuel vapor from the fuel tank through the valve around valve element 40 to canister 24. Removal of cap 18 from the filler neck inlet 14 results in an equalization of pressures on both sides of diaphragm 52 and carrier 64, with the atmospheric pressure in chamber 93 being balanced by atmospheric pressure transmitted from filler neck inlet 14 via line 50 (not visible from the perspective in FIG. 5) to the upper surface of the diaphragm. In this position the diaphragm and carrier exert no force on the valve element 40, such that spring 46 and the tank/canister pressure differential across valve element 40 bias the valve element up to the closed position abutting valve seat 38 to block vapor flow from the fuel tank to the canister.

The embodiment of the invention shown in FIG. 10 is particularly advantageous in that the rolling seal 90 performs a canister purge protection function during refueling. Modern vehicles often are provided with systems to periodically purge the vapor canister of fuel and fuel vapor. During the purge cycle a vacuum is created in vapor outlet 34, and it is desirable to prevent the flow of fuel vapor from the tank to the canister. During refueling, when substantial fuel vapor is generated in the tank and diaphragm 52 is equalized to close the vent valve, vacuum in the canister outlet 34 creates a pressure differential tending to open the valve. Rolling seal 90 protects diaphragm 52 from the purge vacuum, and by making the surface area of rolling seal 90 equal to or slightly less than that of valve element 40, the pressure differential across the latter and the force of spring 46 are sufficient to maintain valve element 40 on the valve seat.

FIGURE 11 EMBODIMENT

Figure 11:
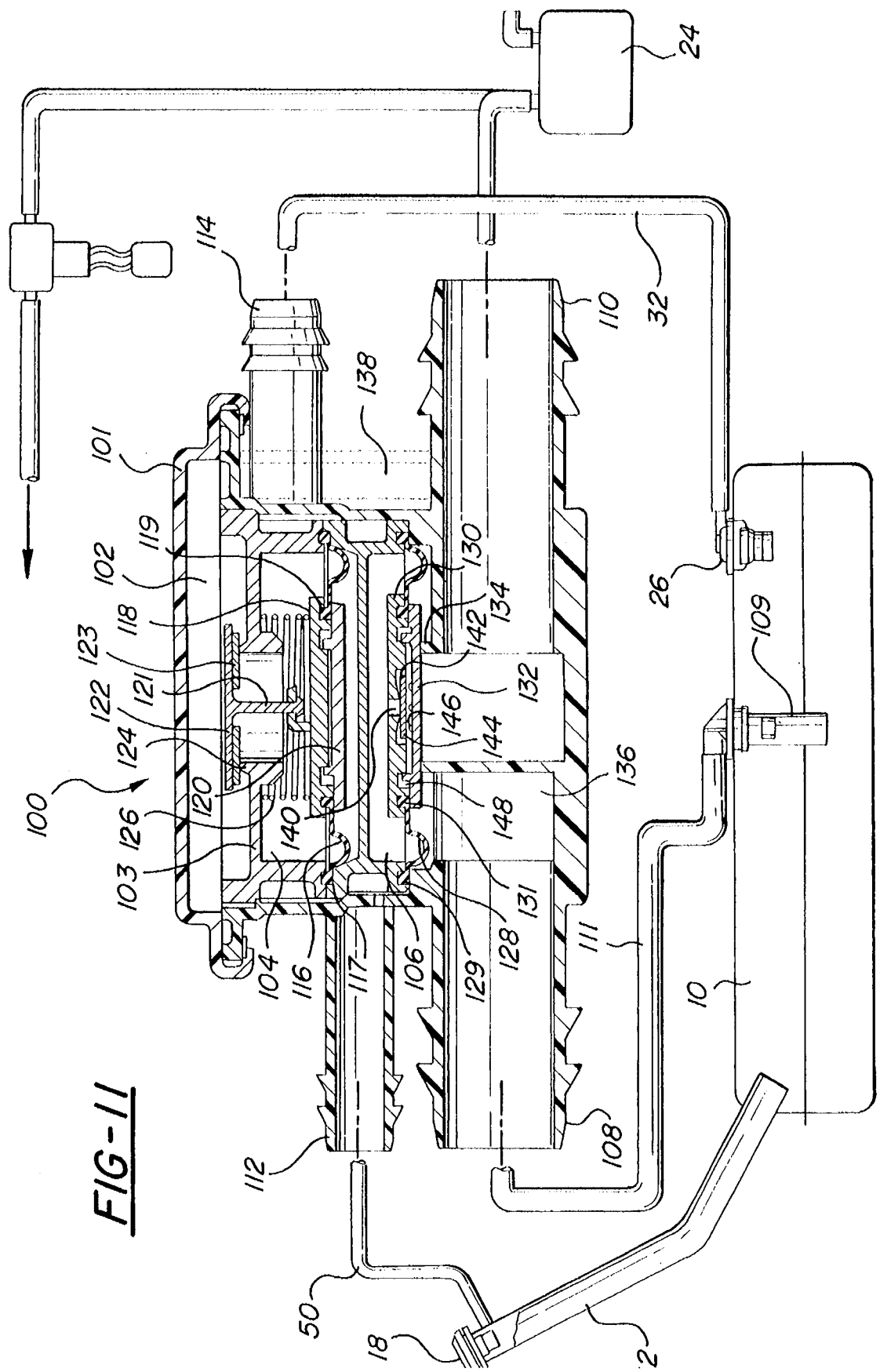
FIG. 11 is an overall schematic view of a fuel system embodying a fifth embodiment of the inventive diaphragm valve and a sectional view of the details of the diaphragm valve showing its location and operative connections in the system.

Referring now to FIG. 11, an improved fifth embodiment of the diaphragm valve of the present invention is generally shown at 100 comprising a hollow valve body or housing 101 with materials the same or similar to those used in the previously disclosed embodiments. Valve 100 is generally divided into an upper chamber 102, a middle chamber 104, and a lower chamber 106. Valve 100 communicates with and receives vapor from the fuel tank via fuel tank inlet 108 via a suitable line or hose (not shown) connected either directly to the fuel tank or to a fluid-level responsive fill control valve 109 in the fuel tank. While a fill particular control valve is not shown in the present illustrated embodiment, a suitable valve is found, for example, in U.S. Pat. No. 5,062,444 issued Nov. 5, 1991.

Valve 100 is connected to the vapor canister or vapor trap 24 by way of canister outlet 110. Valve 100 is connected to the filler neck inlet area via signal pressure line inlet 112, which transmits pressure conditions at the filler neck inlet to the valve. Valve 100 is also connected to one or more rollover valves 26 via rollover inlet 114. A description of rollover valve 26 is set forth above.

Valve 100 is also divided into two separate fuel vapor flow paths: a refuel venting flow passage 136 and a rollover venting passage 138, both of which lead to canister outlet 110. Upper diaphragm 116 is connected in airtight manner about its periphery to the valve body at flange 117, mounted below partition 103. Diaphragm 116 includes internal, rigid carrier plate structure 118,120 connected to the diaphragm at flange 119, also in an airtight manner. Carrier structure 120 is connected to the stem 121 of valve plate 122 resting on rollover vent valve seat 124 in upper chamber 102. Valve plate 122 is provided on its lower surface with an annular seal 123 of suitably pliable material to form a tight seal with the valve seat 124. A light bias spring 126 is mounted at one end to the lower surface of partition 103 radially outward of valve seat 124, and at the other end to carrier structure 118 of diaphragm 116. Bias spring 126 tends to urge diaphragm 116 and valve plate 122 downwardly to the closed position against valve seat 124.

A second lower diaphragm 128 is connected about its periphery to valve body 101 at flange 129, also in an airtight manner. Lower diaphragm 128 also includes internal carrier plate 130 and an integral lower valve plate 132, both of which are fastened to internal flange 131 in an airtight fashion. Valve plate 132 mates with a refuel vent valve seat 134 to completely close refuel vent passage 136.

Both diaphragms 116 and 128 are preferably of the same general construction as the diaphragms disclosed in the above embodiments, although it will be apparent to those skilled in the art that other materials can be used. The same is true of the carrier and valve plate structure associated with diaphragms 116 and 118.

Carrier plate 130 has a drainage throughbore 140 communicating with a check valve chamber 142 defined between carrier plate 130 and valve plate 132. Chamber 142 contains a small, light check valve plate 144 which is freely movable between valve plate 130 and valve plate 132. Check valve 144 normally rests on a plurality of small beads 146 to prevent the check valve from sticking to valve plate 132 due to liquid surface tension. The liquid flow path runs from chamber 142 between plates 130 and 132 to the portion of refuel vent passage 136 which communicates with inlet 108 when valve plate 132 is closed against seat 134. The radial dimensions of check valve 144 are slightly less than those of chamber 142 to permit the free flow of liquid around the check valve when throughbore 140 is open.

As in the previous embodiments of the inventive diaphragm valve, venting from rollover valve 26 through valve 100 to the vapor canister is controlled by pressure conditions at the filler neck inlet. When the filler pipe cap is on, the filler pipe inlet is at tank pressure, the rollover valve 26 is at tank pressure, and canister 24 is at atmospheric pressure. Upper diaphragm 116 is accordingly pressure balanced, with tank pressure from signal line inlet 112 on its lower surface and tank pressure from rollover inlet 114 on its upper surface, while valve plate 122 has tank pressure applied to its lower surface and atmospheric pressure applied to its upper surface. The imbalance across valve plate 122 forces it upwardly against the bias of spring 126 to open rollover venting passage 138. Fuel vapor is then vented from the fuel tank through rollover valve 26, rollover inlet 114, middle chamber 104, valve seat 124, upper chamber 102, and rollover vent passage 138 to canister outlet 110. When the filler pipe cap 18 is removed, the filler pipe inlet is at atmospheric pressure. This results in atmospheric pressure being transmitted to the lower surface of diaphragm 116 via signal line 50 and inlet 112, while tank pressure is maintained on its upper surface via rollover inlet 114, creating a pressure balance across diaphragm 116 tending to force it downwardly. Although the pressure imbalance across valve plate 122 and diaphragm 116 is equal when the filler cap is off, the greater surface area of diaphragm 116, along with the downward bias of spring 126 enables it to overpower the valve plate 122 and force it downwardly against rollover vent valve seat 124 to shut off the venting between rollover valve 26 and the canister.

The valve of FIG. 11 differs from the embodiments shown in FIGS. 1–10 in that venting from the fuel tank to the vapor canister continues when the cap is off, through independent refuel vent passageway 136. As mentioned above, valve 100 is connected via inlet 108 to a liquid level responsive fill control vent valve 109 mounted in the fuel tank. Fill control vent valve 109 opens and closes solely in response to the liquid level in the fuel tank, independently of the pressure conditions at the filler pipe inlet. Accordingly, when the tank is below the full fuel level and is being refueled with the filler pipe cap off, fill control vent valve 109 remains open to vent fuel vapor from the fuel tank to inlet 108. The atmospheric pressure conditions at the filler pipe inlet which serve to close rollover venting through valve 100 simultaneously serve to open refuel venting through the valve in the following manner. With the filler pipe cap off and atmospheric pressure conditions at the filler pipe inlet, atmospheric pressure is transmitted via signal line 50 and inlet 112 to the upper surface of diaphragm 128, while fuel tank pressure is transmitted to the lower surface of diaphragm 128 radially outward of valve seat 134 via fill control vent valve 109 and refuel inlet 108. This pressure imbalance across diaphragm 128 forces it upwardly to lift valve plate 132 off valve seat 134 and opens the refuel vent passage 136 to the vapor canister.

When refueling is completed, the cap is replaced on the filler pipe, the filler pipe inlet returns to tank pressure, which is then transmitted via signal line 50 and inlet 112 to the upper surface of diaphragm 128. The lower surface of diaphragm 128 is divided into two regions, the first radially outward of valve seat 134 and communicating with refuel inlet 108, and the second radially inboard of valve seat 134 and communicating with the canister via outlet 110. In the cap-on condition the tank pressure acting on the upper surface of diaphragm 128 overpowers the tank pressure acting on the lower surface of diaphragm 128 radially outboard of valve seat 134, forcing valve plate 132 down against valve seat 134 and shutting off venting from the fuel tank through fill control vent valve 109.

In general, then, valve 100 permits venting from rollover valve 26 to the vapor canister when the filler pipe cap is on, and permits venting from the fuel tank to the canister through fill control vent valve 109 when the cap is off and the tank is being refueled.

When the filler pipe cap is on, rollover venting through valve 100 is interrupted only in the event of a rollover situation which shuts off rollover valve 26 at the fuel tank. With the filler pipe cap off, refill venting is only interrupted when maximum fuel level is reached, closing the fuel level responsive fill control vent valve 109 at the fuel tank.

Vacuum conditions can occur in the fuel tank when the fuel vapor volume therein contracts due to rapid cooling. While vacuum in the fuel tank closes the rollover vent passage 138 by closing valve plate 122, the vacuum applied to the upper surface of diaphragm 128 (via signal line 50 and inlet 112) and the lower surface of diaphragm 128 (via line 111 and inlet 108) outboard of valve seat 134 enable the atmospheric pressure from canister outlet 110 to force valve plate 132 upwardly and permit reverse flow venting to the fuel tank to prevent its collapse.

In the event of canister purge as discussed above, vacuum pressure in canister outlet 110 will close both valve plates 132 and 122 to properly seal the canister from the fuel tank during the purge process. Any fuel vapor flow through drain throughbore 140 is negligible for purposes of effective canister purging.

The drain path comprising drain throughbore 140, chamber 142 and passage 148 in the valve structure of lower diaphragm 128 prevents liquid fuel in the signal pressure line from collecting on diaphragm 128 and forcing it to the closed position on seat 134. Liquid fuel inadvertently entering chamber 106 during refueling simply drains into the refuel vent passage 136 where it evaporates. The amount of fuel so drained is typically very small, enough to interfere with the proper function of lower diaphragm 128, but not enough to saturate the vapor canister should it be aspirated along with fuel vapor during the refueling vent process.

While drain 140 operates advantageously during refueling to keep vent flow path 136 open, from the standpoint of environmental regulations or concerns it may pose a problem if used alone. While clear during refueling it will vent fuel vapor from high pressure tank inlet 108 and path 136 to and out the lower atmospheric pressure chamber 106, signal line 112 and the open filler neck. Environmental regulations or considerations concerning release of raw fuel vapor to the atmosphere during refueling might be violated by even the relatively small amount of vapor released through drain 140.

To prevent reverse flow of fuel vapor from the fuel tank to the signal line during refueling, a check valve 144 is provided in chamber 142. Check valve 144 is a lightweight disk of a diameter greater than throughbore 140 and slightly less than chamber 142, ensuring complete closure of the drain throughbore when raised against rounded seat 141 and permitting unobstructed fluid flow through chamber 142 and drain path 148 when lowered. Check valve 144 may comprise, for example, the same acetal resin or fluorosilicone rubber used in other parts of the valve. During refueling, the filler pipe cap is off and signal pressure line 112 and chamber 106 are at atmospheric pressure, while fuel tank inlet 108 and passage 148 are at higher tank pressure. The imbalance forces check valve plate 144 up against carrier plate 130 to close throughbore 140. This prevents fuel vapor release to the atmosphere through the open filler neck inlet area during refueling, in accordance with environmental regulations considerations.

While the drain throughbore check valve 144 is illustrated only in the embodiment of FIG. 11, it will be understood by those skilled in the art that the check valve can be used in any of the embodiments of FIGS. 1–10 having a drain throughbore formed in the diaphragm valve.

These and other modifications lying within the scope of the appended claims will be apparent to those skilled in the art. The foregoing description is not intended to be limiting, but merely sets forth a descriptive embodiment of the invention in accordance with 35 USC 112.

We claim:

1. In a vehicle fuel system of the type which includes a fuel tank, a filler pipe for admitting fuel to the tank, a selectively closeable filler pipe inlet and a vapor trap for collecting fuel vapor vented from the tank:

a vent valve connected between the tank and the vapor trap, having a first condition and a second condition, said vent valve including first means for placing said vent valve in the first condition when the filler pipe inlet is closed and second means for placing said vent valve in the second condition when the filler pipe inlet is open, a rollover valve connected between the tank and the vent valve and a fill control valve connected between the tank and the vent valve, the vent valve defining a first vapor flow path from the rollover valve to the vapor trap, and a second vapor flow path from the fill control valve to the vapor trap, further including means for opening the first vapor flow path and independently closing the second vapor flow path in the first condition, and means for closing the first vapor flow path and independently opening the second vapor flow path in the second condition.

2. A fuel system of the type including a fuel tank, a filler pipe for discharging fuel into the tank, a selectively closeable filler pipe inlet and a vapor trap for collecting fuel vapor vented from the tank, the fuel system further comprising:

a rollover valve disposed between the fuel tank and the vapor trap; and a vent valve having a valve body, a vapor outlet to the vapor trap, and a vapor inlet from the rollover valve, a valve seat between the vapor inlet and the vapor outlet, a valve element matable with the valve seat, and a control element connected to the valve element for maintaining the valve element on the valve seal when the filler pipe inlet is at atmospheric pressure, and for displacing the valve element from the valve seat when the filler pipe inlet is at tank pressure, further including a fill control valve disposed between the fuel tank and the vapor trap, the vent valve including a second vapor inlet from the fill control valve and a second valve seat between the second vapor inlet and the vapor outlet, a second valve element matable with the second valve seat, and a second control element connected to the second valve element for displacing the second valve element from the second valve seat when the filler pipe inlet is at atmospheric pressure, and for maintaining the second valve element on the second valve seat when the filler pipe inlet is at tank pressure, wherein said first and second valve elements operate independently of each other.

3. A fuel system of the type including a fuel tank, a filler pipe for discharging fuel into the tank, a selectively closeable filler pipe arid a vapor trap for collecting fuel vapor vented from the fuel tank, the fuel system further comprising:

a rollover valve;

a vent valve;

means connecting the rollover valve and the vent valve in series between the tank and the vapor trap;

the vent valve having a valve body, a vapor outlet to the vapor trap, a filler pipe inlet, and a vapor inlet from the rollover valve, a first valve seat between the vapor inlet and the vapor outlet, a first valve element matable with the valve seat, and a first control element connected to the first valve element for maintaining the first valve element on the first valve seat when the filler pipe inlet is at atmospheric pressure, and for displacing the first valve element from the first valve seat when the filler pipe inlet is at tank pressure, further including a fill control valve and means connecting the fill control valve and the vent valve in series between the tank and the vapor trap, the vent valve further including a second vapor inlet from the fill control valve, a second valve seat between the second vapor inlet and the vapor outlet, a second valve element matable with the second valve seat, and a second control element connected to the second valve element for maintaining the second valve element on the second valve seat independently of the first valve element when the inlet from the filler pipe is at tank pressure, and for displacing the second valve element from the second valve seat independently of the first valve element when the inlet from the filler pipe is at atmospheric pressure, the vent valve connecting the rollover valve and the fill control valve in parallel.

4. A fuel system as defined in claim 3, wherein the vent valve further includes a second vapor inlet from the fill control valve, a second valve seat between the second vapor inlet and the vapor outlet, a second valve element matable with the second valve seat, and a second control element connected to the second valve element for displacing the second valve element from the second valve seat when the filler pipe inlet is at atmospheric pressure, and for maintaining the second valve element on the second valve seat when the filler pipe inlet is at tank pressure.

5. In combination with a fuel storage tank for a vehicle having a fuel vapor canister, a fuel system comprising:

a filler pipe having a selectively closeable inlet for discharging fuel into the fuel storage tank;

a rollover valve connected between the tank and the trap to vent the tank when the vehicle is in a normal attitude and to close the tank when the vehicle is not in a normal attitude;

a control valve in series with the rollover valve and operable between first arid second conditions; and condition-responsive means for operating the control valve in response to the vapor pressure conditions near the filler pipe inlet, further including a fill control valve connected between the tank and the vapor trap to vent the tank when the liquid fuel level in the tank is below a predetermined maximum, the control valve connected in series with the fill control valve, the control valve including first means for venting fuel vapor from the rollover valve to the vapor trap in the first condition and second means for venting fuel vapor from the fill control valve to the vapor trap in the second position, said first and second means operating independently of one other.

6. A fuel system as defined in claim 5, the control valve further including means for shutting off venting from the fill control valve in the opened position, and means for shutting off venting from the rollover valve in the second position.

7. In combination with a fuel tank for a vehicle having a fuel vapor trap:

a rollover valve connected to the fuel tank;

a fuel-level responsive valve connected to the fuel tank;

a control valve connected to the rollover valve, the fuel level responsive valve and the vapor trap, the control valve defining a first vapor flow path between the rollover valve and the vapor trap, and a second vapor flow path between the fuel level responsive valve and the vapor trap; and condition-responsive means for operating the control valve to alternately open and close the first and second flow paths the condition-responsive means including independent first and second valve elements.

8. A fuel system as defined in claim 7, further including a filler pipe for discharging fuel into the fuel tank and a selectively closeable filler pipe inlet, the condition-responsive means operating the control valve in response to pressure conditions near the filler pipe inlet.

9. A fuel system as defined in claim 8, wherein the condition-responsive means closes the first vapor flow path and opens the second vapor flow path when the filler pipe inlet is open, and opens the first vapor flow path and closes the second vapor flow path when the filler pipe inlet is closed.

10. A fuel system as defined in claim 9, wherein the condition-responsive means further comprise a first diaphragm for moving the first valve element on and off a first valve seat to close and open the first vapor flow path, and a second diaphragm for moving the second valve element on and off a second valve seat to close and open the second vapor flow path.

11. A fuel system as defined in claim 10, wherein the first diaphragm communicates with the filler pipe inlet on one side and the rollover valve on the other side, and the second diaphragm communicates with the filler pipe inlet on one side and the fill control valve on the other side.

12. A fuel system as defined in claim 11, wherein the first valve means communicates with the rollover valve on one side and with the vapor trap on the other side, and the second valve means communicates with the filler pipe inlet on one side and the vapor trap on the other side.

13. A fuel system as defined in claim 12, wherein the area of the first and second valve elements is less than-the area of the first and second diaphragms, respectively.

14. A fuel system as defined in claim 12, wherein the second valve element has a drain path formed therethrough communicating with the filler pipe inlet and the second vapor flow path.

15. A fuel system as defined in claim 14, wherein the drain path further includes means for preventing reverse fuel vapor flow from the fuel tank to the filler pipe inlet.

16. A fuel system as defined in claim 15, wherein the means for preventing reverse fuel vapor flow comprise a check valve in the drain path.

17. A fuel system as defined in claim 15, wherein the drain path communicates only with the fuel tank when the second valve element is in the closed position.

18. In combination with fuel tank for a vehicle having a fuel vapor trap:

a rollover valve connected to the fuel tank;

a fuel-level responsive valve connected to the fuel tank;

a control valve connected to the rollover valve, the fuel level responsive valve and the vapor trap, the control valve defining a first vapor flow path between the rollover valve and the vapor trap, and a second vapor flow path between the fuel level responsive valve and the vapor trap;

condition-responsive means for operating the control valve to alternately open and close the first and second flow paths;

a filler pipe for discharging fuel into the fuel tank and a selectively closeable filler pipe inlet, the condition-responsive means operating the control valve in response to pressure conditions near the filler pipe inlet;

wherein the condition-responsive means include drainage means between the filler pipe inlet and the second vapor flow path.

19. A fuel system as defined in claim 18, wherein the drainage means include means for preventing reverse flow of fuel vapor from the fuel tank to the filler pipe inlet through the drainage means.

20. A fuel system as defined in claim 19, wherein the means for preventing reverse vapor flow comprise a vapor-pressure operated check valve in the drainage means.

21. In a vehicle fuel system of the type which includes a fuel tank, a filler pipe for admitting fuel to the tank, a selectively closeable filler pipe inlet and a vapor trap for collecting fuel vapor vented from the tank;

a vent valve connected between the tank and the vapor trap said vent valve including first means for placing said vent valve in a first condition when the filler pipe inlet is closed and second means for placing said vent valve in a second condition when the filler pipe inlet is open, the vent valve comprising a valve body having a vapor inlet from the tank, a vapor outlet to the vapor trap, a valve seat between the inlet and outlet and a valve element biased toward and matable with said seat, said valve element being normally responsive to tank pressure to be displaced from said seat to provide vapor venting from the tank to the trap;

a control element connected to the valve element and responsive to the net of atmospheric pressure in the filler pipe inlet and vapor pressure in the tank to maintain the valve element on said seat;

drainage means formed in the valve element to permit liquid fuel to drain through the valve element regardless of the position of the valve element on the valve seat, the drainage means comprising a drain path formed in the valve element communicating with the filler pipe inlet and the fuel tank, the drainage means further including check valve means in the drain path for preventing reverse flow of fuel vapor from the fuel tank to the filler pipe inlet.

22. For use in a vehicle fuel system of the type which includes a fuel tank, a filler pipe for admitting fuel to the tank, a selectively closeable filler pipe inlet, a vapor trap for collecting fuel vapor vented from the tank, a rollover valve associated with the tank and a fill control valve associated with the tank, a vapor venting control valve comprising:

a valve body having a vapor inlet from the filler pipe, a vapor inlet from the rollover valve, a vapor inlet from the fill control valve, and a vapor outlet to the canister;

first and second diaphragm-operated valve elements comprising a diaphragm control element and a valve member;

a pressure chamber defined between the diaphragms of the first and second valve elements, the pressure chamber connected to the vapor inlet from the filler pipe, the first and second valve elements being pressure balanced such that higher vapor pressure in the pressure chamber forces the valve elements in opposite directions to open a rollover venting path associated with the first valve element and to simultaneously close a fill control venting path associated with the second valve element, and lower pressure in the pressure chamber when the filler pipe inlet is open forces the first and second valve elements toward one another to close the rollover venting path and open the fill control venting path.

* * * * *

UNITED STATES PATENT AND TRADEMARK OFFICE
CERTIFICATE OF CORRECTION

PATENT NO. : 5,524,662
DATED : June 11, 1996
INVENTOR(S) : Benjey et al.

It is certified that error appears in the above-indentified patent and that said Letters Patent is hereby corrected as shown below:

Column 4, line 37, delete "20" and insert --10--;

Column 6, line 26, delete "Chat" and insert --that--;

Column 9, line 28, delete "fill particular" and insert --particular fill--;

Column 12, line 18, delete "considerations" and insert --or considerations--;

Column 13, line 15, delete "pipe arid" and insert --pipe and--;

Column 13, line 67, delete "first arid" and insert --first and--;

Column 14, line 16, delete "opened position" and insert --first position--.

Signed and Sealed this

Twelfth Day of November, 1996

Attest:

BRUCE LEHMAN

*Attesting Officer*　　　*Commissioner of Patents and Trademarks*